Nov. 24, 1953
J. C. RUTHERFORD
2,660,104
VEHICLE MOUNTED TAKE-OUT PLOW
Filed Oct. 3, 1949
2 Sheets-Sheet 2
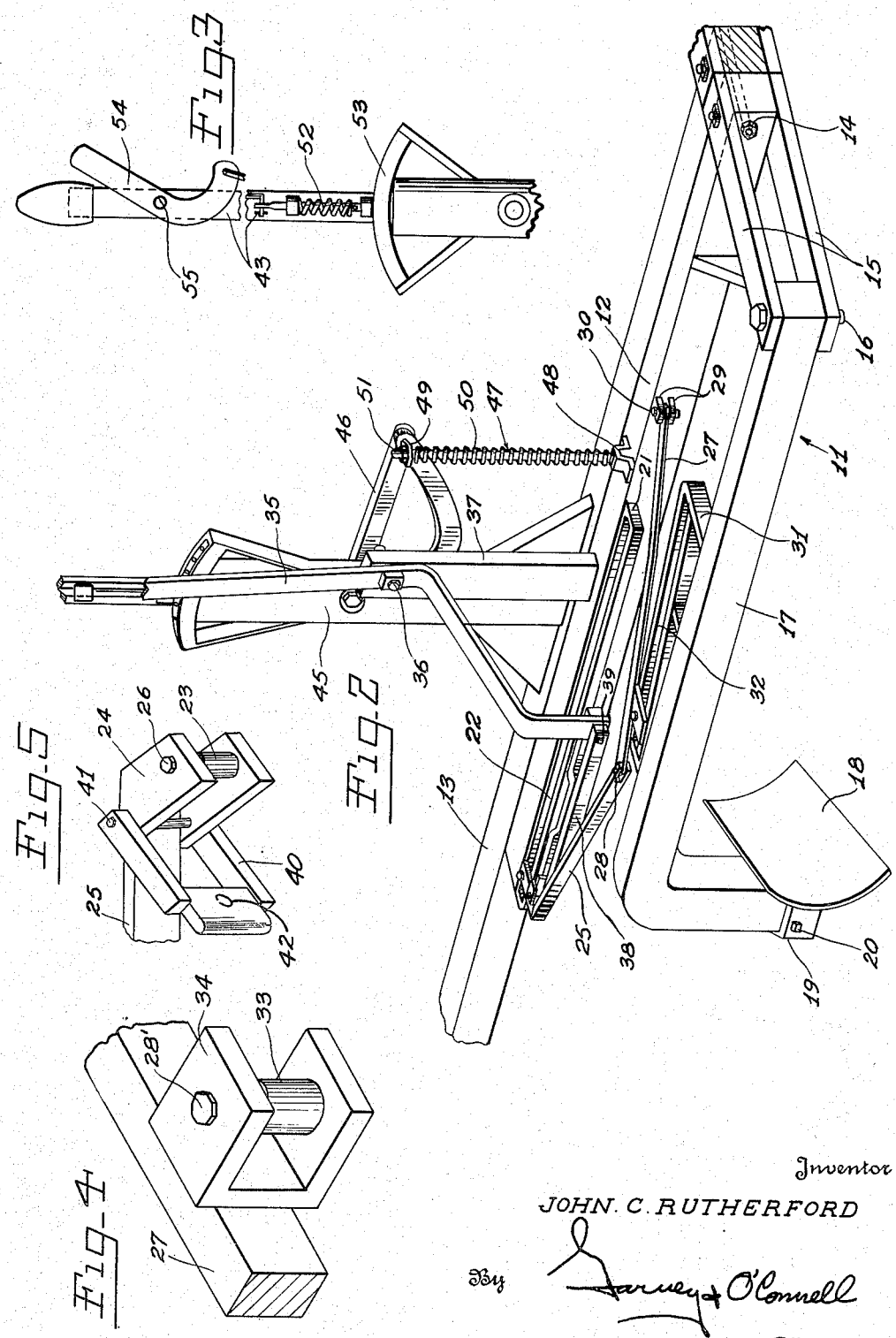
Inventor
JOHN. C. RUTHERFORD
By
Harney & O'Connell
Attorneys Patented Nov. 24, 1953

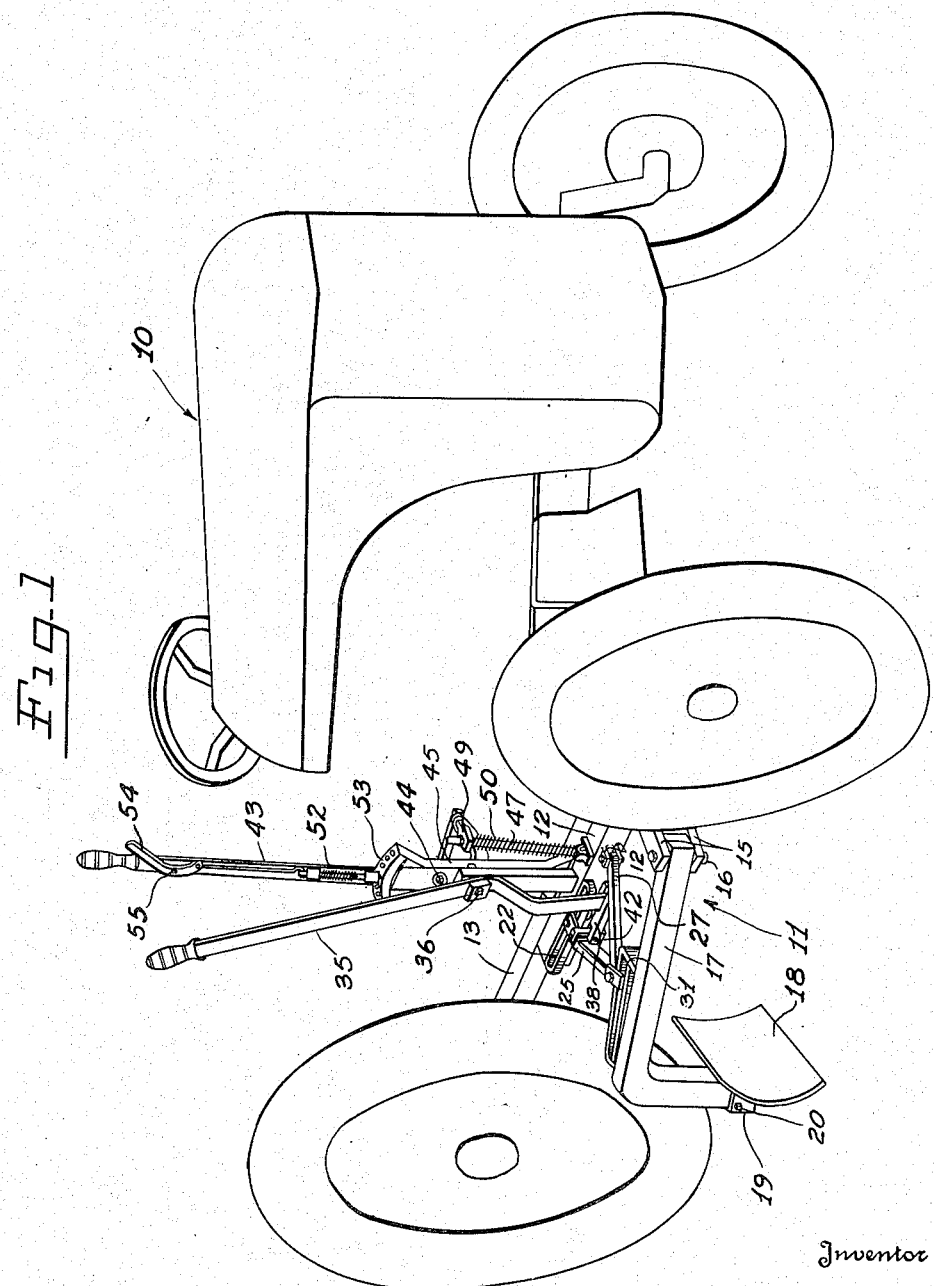

2,660,104

UNITED STATES PATENT OFFICE 2,660,104

VEHICLE MOUNTED TAKE-OUT PLOW

John C. Rutherford, Hammondsport, N. Y.

Application October 3, 1949, Serial No. 119,243

1 Claim. (Cl. 97—47.38)

This invention is a vehicle-mounted take-out plow particularly designed for operation between the vines, hills or trees growing in rows for removing earth, weeds and trash between the vines, hills or trees of a row; and the present invention embodies certain new and useful improvements over the take-out plow disclosed in my Patent No. 2,539,864, issued January 30, 1951.

Among the objects of the present invention is to provide a take-out plow assembly that may be readily mounted on a tractor and which will perform the intended operations with greater facility and better results than are obtained by the take-out plow assembly disclosed in the aforementioned pending application.

In accordance with this invention the take-out plow assembly is so constructed and arranged that the earth working blade thereof will swing laterally with respect to the tractor on a radius rather than directly inwardly and outwardly, with the result that a more efficient and complete cultivation between the vines, hills, or trees of a row is accomplished therewith.

Also in accordance with the present invention, the earth working blade of the assembly may be reversed so that it can be used with facility not only for removing the trash, weeds and the like between the vines, etc. of a row, but also to replace or push the earth back into the row between the vines or plants.

In addition, with this invention the take-out plow assembly may be used to advantage on sidehill land where the take-out operation must be performed on both sides of the row if such operation is to be properly performed.

The present invention, together with its objects and advantages, will be best understood and appreciated when the following detailed description thereof is read with reference to the accompanying drawing, in which is illustrated what is presently considered a preferred embodiment of the invention, and wherein:

Figure 1 is a perspective view illustrating an application of the invention, the tractor upon which the take-out plow assembly is mounted being shown fragmentarily;

Figure 2 is a perspective view, on an enlarged scale of the improved take-out plow assembly, a portion of the side member of the chassis of the tractor being shown;

Figure 3 is an enlarged fragmentary elevational view of a rack and detent assembly forming part of the invention;

Figure 4 is a fragmentary perspective view of a roller-equipped link forming part of the invention, and Figure 5 is a fragmentary perspective view of one end portion of a second roller-equipped link forming part of the invention.

Referring now in detail to the drawings, there is shown fragmentarily a tractor 10, so much only of the tractor being shown as is thought necessary for an understanding of the invention. The take-out plow assembly of this invention is indicated generally by the reference numeral 11, and as shown, is mounted on the tractor at one side thereof between the front and rear traction wheels of the tractor in a manner not to anywise interfere with the operation of the tractor or to require any material alterations in the tractor structure.

In accordance with this invention the take-out plow assembly 11 comprises an attaching beam 12 that is disposed at one side of the side member 13 of the chassis (not shown) of the tractor, and at its forward end is pivoted to the chassis member 13 by any suitable pivotal mounting such as shown in Figure 2 and indicated generally by the reference numeral 14. At its forward or pivoted end the beam 12 is provided with a lateral extension which, in the present instance, is illustrated as being in the form of a pair of upper and lower parallel, co-extensive arms 15—15. Pivoted to the arms 15 at the free ends thereof, and as indicated at 16, is a plow beam 17 for lateral swinging movement relative to the beam 12. Beam 17 is shaped so that the free or rear end thereof extends downwardly. To the depending end of the beam 17 is removably attached an earth working tool or blade 18. The blade 18 is provided at its rear or convex side with an attaching loop 19 adapted to be sleeved onto the depending end of beam 17 and secured in position thereon through the medium of bolt and nut means 20. It will be apparent that tool or blade 18 may be mounted on the beam 17 to face forwardly as shown in the drawing, and which position it will occupy when employed for removing the weeds and trash from between the vines or plants of a row; or alternately may be mounted on the beam in a position reverse to that shown in Figure 2, and when in this alternate position, employed to advantage for pushing the dirt back into the row between the vines or plants thereof.

For moving the plow beam 17 inwardly and outwardly or laterally with respect to beam 12, the beams 12 and 17 are connected together through the medium of a linkage assembly now to be described. This linkage assembly comprises a narrow elongated guide member 21 that is suitably mounted on the beam 12 to extend lengthwise thereof unwardly from the free or rear end thereof. Guide membr 21 is preferably in the form of an elongated frame presenting a guide slot 22 in which operates a roller 23 on the end 24 of a link 25. The mentioned end 24 of link 25, as shown in Figure 5, is in the form of a pair of upper and lower plates extending in spaced parallelism at an angle to link 25 so as to straddle the guide member 21. Roller 23 is rotatably supported between the aforementioned plates at the end 24 of link 25 through the medium of an axle bolt 26.

At the opposite end thereof link 25 is bifurcated or otherwise formed to accommodate one end of a link 27, links 25 and 27 being pivotally connected at the mentioned ends thereof as at 28. At the other end thereof link 27 is pivoted to the beam 12 forwardly of guide 21, beam 12 being provided with a pair of vertically spaced apertured lugs 29 between which the forward end of link 27 is accommodated and through the medium of which and a bolt 30, link 27 is pivoted to beam 12.

Mounted on the inner side of the plow beam 17 and extending longitudinally thereof is a guide 31. Guide 31 is in the form of a skeleton frame structure formed of metal or other suitable material and is secured to the beam 17 in any suitable manner. Guide 31 is formed to provide what may be termed a cam slot 32 that, as shown, extends somewhat obliquely with respect to the longitudinal dimensions of beam 17, the spacing between the slot 32 and the beam 17 progressively increasing in a forward direction.

Arranged to operate within the cam slot 32 is what may be termed a cam roller 33 carried by link 27 adjacent that end of the link 27 pivoted to link 25. As shown in Figure 4, roller 33 is carried by link 27 through the medium of a U-shaped member 34 that extends laterally from the link 27 and accommodates an axle bolt 28' for the roller 33. It will be apparent that the member 34 straddles the guide 31 with the roller 33 accommodated within the slot 32 of the guide 31.

To manipulate the linkage connection just described between beams 12 and 17, there is provided a hand lever 35. Lever 35, intermediate its ends, is pivoted as at 36 to a standard 37 suitably mounted on and rising from beam 12. At its lower end lever 35 is operatively connected to the link 25 through the medium of a link 38. Link 38 at one end is pivoted to the lever 35 as at 39 and at the opposite end thereof has a universal connection with link 25 through the medium of a yoke 40 that is pivoted to the link 25 as at 41 and is also pivoted to the link 38 as at 42. (See Figures 2 and 5.)

From the foregoing it will be apparent that by proper manipulation of lever 35 motion is transmitted to the link 25 to cause the roller 23 associated therewith to move lengthwise in the guide slot 22, and this movement of link 25 is transmitted to link 27 to cause the roller 33 associated with the last-mentioned link to move lengthwise in the cam slot 32. Movement of roller 33 in the slot 32 will cause plow beam 17 to swing on its pivot 16 laterally inwardly or outwardly depending upon the direction of movement of the roller 33 in slot 32. Manifestly when the lever 35 is swung in one direction to cause the roller 33 to move forwardly in slot 32, beam 17 will be caused to swing outwardly from beam 12, or from the position shown in Figure 2 to substantially the position shown in Figure 1, while movement of the lever 35 in an opposite direction will cause roller 33 to move rearwardly within the slot 32 or substantially to the position shown in Figure 2 for causing the beam 17 to move inwardly towards beam 12 from substantially the position shown in Figure 1 to substantially the position shown in Figure 2.

It will thus be seen that with blade 18 facing, as shown in the drawings, the same may be operated between vines, hills or trees of a row to remove grass and weeds from between the vines, hills or trees of a row, and with the blade 18 facing in a direction directly opposite to that shown in the drawings, the blade may be operated for pushing the dirt back between the vines, hills or trees of a row.

For controlling the working depth of the blade 18, and for lifting the blade 18 upwardly to an out-of-the-way position when the tractor is moving from one site of operation to another, there is provided a lifting and lowering lever 43. This lever is pivoted adjacent its lower end as at 44 to a standard 45 suitably mounted upon and rising from the chassis frame member 13. At its pivoted or lower end lever 43 is provided with a suitable lateral extension 46 that has a suitable link connection 47 with the beam 12 of the take-out plow assembly. Any suitable connection 47 may be employed, but for purposes of illustration I have shown the same as consisting of a rod extending upwardly from an anchor bracket 48 mounted on the beam 12 and having at its upper end a working fit through an eye bolt 49 provided on the lever extension 46. A spring 50 is convoluted about the rod of the connection 47 between the anchor bracket 48 and the eye bolt 49 and a stop nut 51 is threaded on the upper end of the aforementioned rod. It will thus be seen that by swinging the lever 43 in a counterclockwise direction beam 12, plow beam 17 and associated parts will be caused to swing upwardly as a unit to raise the blade 18 to the desired elevation.

To secure the blade 18 at the desired elevation or at any selected digging depth, lever 43 is equipped with a suitable spring biased detent 52 cooperable with a rack segment 53, in a manner believed to be apparent, and which segment is suitably mounted on the aforementioned standard 45. A suitable manipulating lever 54 for the detent 52 has a link connection with the latter and is pivotally mounted as at 55 on the handle 43 (see Figures 1 and 3).

From the foregoing it will be seen that I have provided a take-out plow assembly which may be readily mounted on a vehicle such as a farm tractor, with the manipulating levers of the assembly positioned convenient to the operator, and which, when so mounted on the tractor, provides for the swinging of the earth working tool laterally in and out between the vines, hills or trees of a row to remove the grass and weeds from between the vines, plants, etc. and for replacing the dirt following the clean-out operations. It will also be understood that while the plow assembly of this invention is particularly designed for use in vineyards, it may be employed with equal advantage in berry fields and in connection with any type of row crop that is planted with the rows thereof far enough apart as to permit a tractor to travel between the rows.

While the invention has been described in detail in its presently preferred embodiment, it will, of course, be understood that such has been done for purposes of illustration only and not by way of limitation, and therefore only such limitations are to be imposed thereon as may reasonably come within the scope of the appended claim.

What I claim is:

A take-out plow assembly comprising a beam adapted to be pivotally mounted to the chassis frame of a vehicle at one side of the latter to swing vertically relative to the vehicle, a plow beam pivotally connected with the first beam and adapted to swing laterally toward and away from the vehicle, a manipulating lever for the plow beam pivotally mounted on the first beam, a guide member mounted on the first beam and having a guide slot extending longitudinally thereof, a guide member mounted on the plow beam and having a cam slot, a pair of links pivoted to one another, one of said links having an end pivoted to the first beam and provided intermediate its ends with a cam roller engaging in the cam slot, the other of said links being provided adjacent the free end thereof with a roller engaging in the first-mentioned guide slot, and a link pivotally connecting said lever with the last-mentioned link of said pair whereby upon rocking movement of said lever the plow beam is caused to swing laterally relative to the first-mentioned beam.

JOHN C. RUTHERFORD.

References Cited in the file of this patent

UNITED STATES PATENTS

| Number | Name | Date |
| --- | --- | --- |
| 1,276,051 | Geirman | Aug. 20, 1918 |
| 2,206,283 | Jacobs et al. | July 2, 1940 |
| 2,437,581 | Wray | Mar. 9, 1948 |